March 29, 1960     A. H. SIEVERS     2,930,353
HOG TRAP GATE
Filed Oct. 17, 1958     2 Sheets-Sheet 1
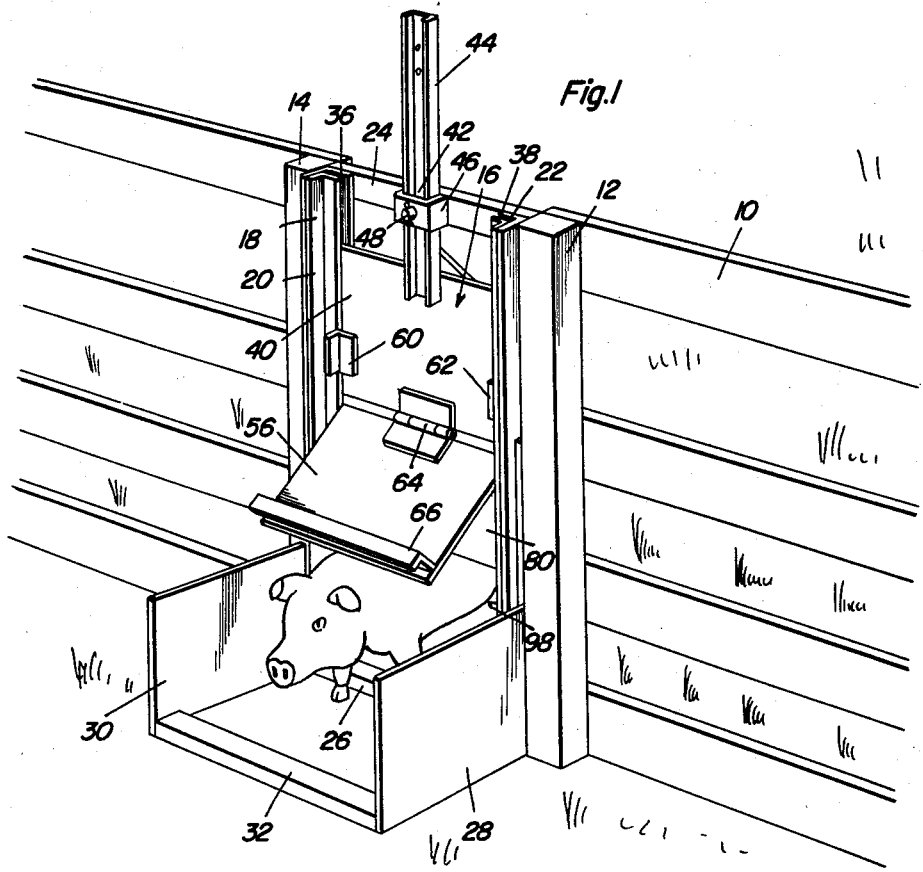
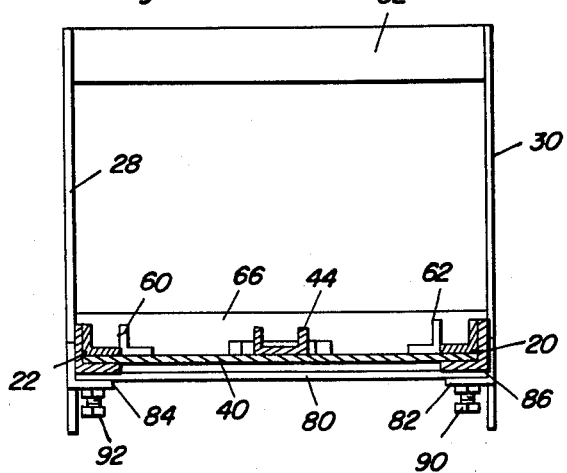
Albert H. Sievers
INVENTOR.

March 29, 1960
A. H. SIEVERS
2,930,353
HOG TRAP GATE
Filed Oct. 17, 1958
2 Sheets-Sheet 2
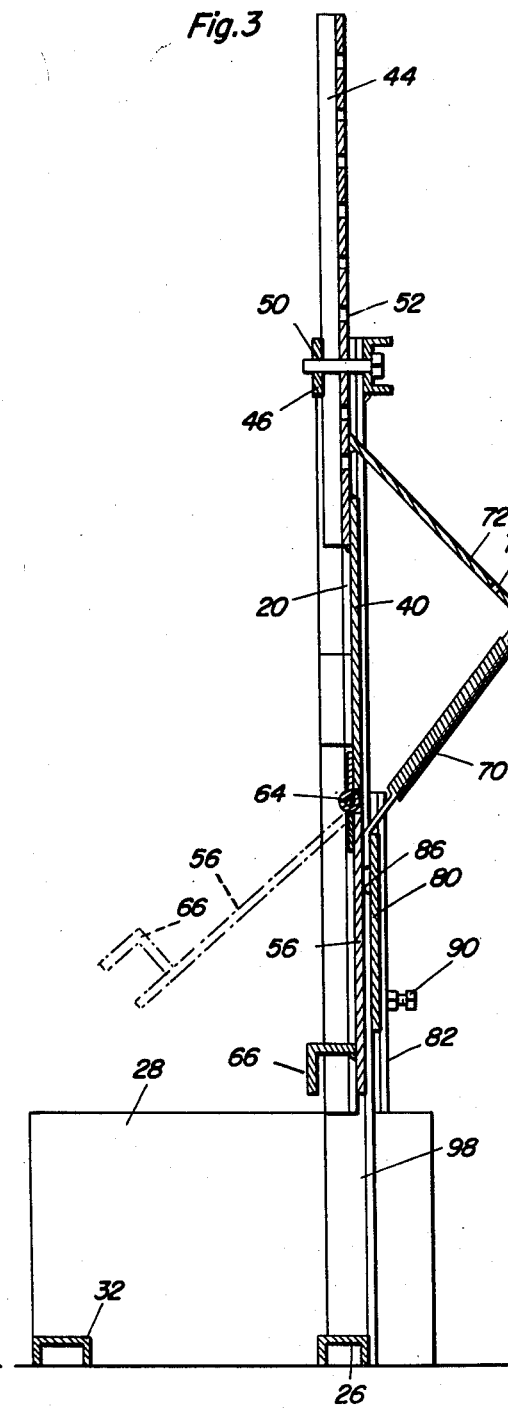
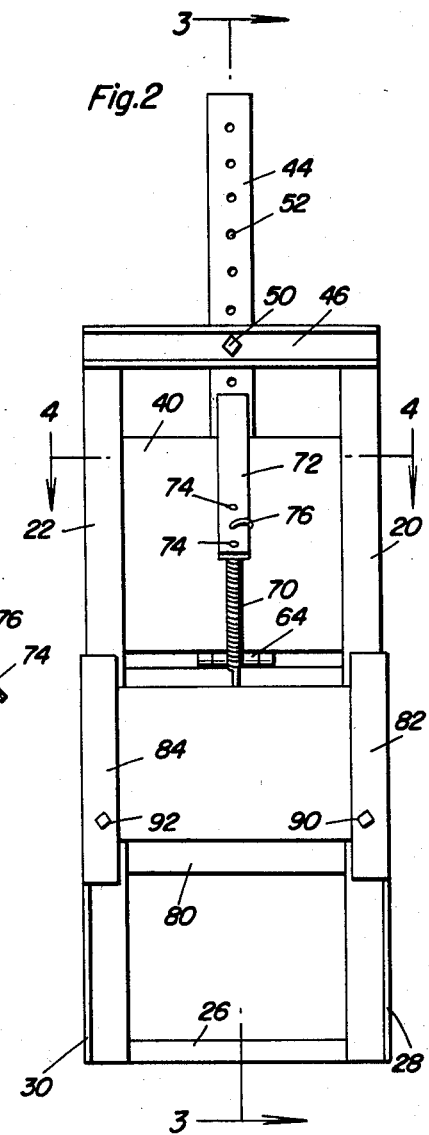
Albert H. Sievers
INVENTOR.

United States Patent Office 2,930,353
Patented Mar. 29, 1960

2,930,353

HOG TRAP GATE

Albert H. Sievers, Fieldon, Ill.

Application October 17, 1958, Serial No. 767,811

3 Claims. (Cl. 119—155)

This invention relates to gates and more particularly to a hog trap gate which may be used in any part of a fence, for instance between two gates, a pair of fence posts or any other place that the farmer chooses.

An object of the invention is to provide a hog trap gate which will enable hogs below a particular size to pass but will exclude larger hogs.

One of the important features of the invention is found in an adjustable plate designed to be moved to selected positions and held in place so that the effective size of the gate opening is adjustable thereby excluding hogs above a selected size. However with the plate adjustable, the exclusion may be made in accordance with the discretion of the farmer.

Another important feature of the invention is the adjustment of the door from the bottom of the gate frame. Here again, the farmer has the option of setting the door to any height within the practical limits of the gate so as to handle hogs in different size ranges.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a gate showing it in operation.

Figure 2 is an elevational view of the gate.

Figure 3 is a sectional view taken on the line 3—3 of Figure 2.

Figure 4 is a transverse sectional view taken on the line 4—4 of Figure 2.

In the accompanying drawings there is a fence 10 with two fence posts 12 and 14 spaced apart and having the gate 16 located therebetween. This is only one of another of ways of using gate 16.

The gate has a main frame 18 provided with vertical side rails 20 and 22 and an upper transverse cross member 24. There is a lower transverse cross member 26 (Figure 3) attached to the lower parts of the rails 20 and 22. Side boards 28 and 30 are attached to the rails 20 and 22, and they have a lower cross member 32 extending therebetween. Cross members 26 and 32 are of substantial construction, for instance inverted channels, although this is subject to variation in large scale production.

Rails 20 and 22 have confronting slots 36 and 38 such as would be constructed by welding a smaller angle onto the flange of a larger angle. Panel 40 is vertically slidable in slots 36 and 38 and held in a selected adjusted position by fastening means 42 connected, as by welding, to the upper part of panel 40. The fastening means consists of channel 44 which is welded to panel 40 and a U-shaped bracket 46 which is welded or otherwise fixed to the frame member 24 between its ends. Locking pin 48 is passed through an opening 50 in bracket 46 and enters one of the group of openings 52 in the center part of the channel or channel member 44. Therefore, panel 40 is vertically adjustable and locked in the selected adjusted position in order to locate door 56 at a selected elevation. In order to stabilize panel 40 there are a pair of angle brackets 60 and 62 attached to panel 40 and contacting the inner edges of rails 20 and 22. Door 56 is connected by hinge 64 to the lower part of panel 40. The door is preferably rectangular in shape and has a reinforcing angle 66 welded at its lower edge. Not only does the angle 66 serve as a reinforcing member but it also prevents the hogs from flipping the door on their backs and going through the gate in the wrong direction.

There are resilient means opposing the movement of the door 56 in one direction. These resilient means consists of springs 70 attached at one end, for example by being spot welded, to door 56 and attached at the other end to a bracket 72. The bracket has a plurality of holes 74 to accept the hook 76 at the opposite end of spring 70. Therefore the effective tensile stress to which the spring 70 is subjected for a given swing is changeable by positioning the spring hook 76 in a selected hole 74. Bracket 72 is welded or otherwise fastened to the channel member 44 so that it is vertically adjustable with the channel member and door 56, these parts moving as one unit.

An important feature of the invention is panel 80. A pair of angles or angle members 82 and 84 are welded to rails 20 and 22 of the main frame and are spaced from surfaces of the rails to form track 86. The side edges of panel 80 are held captive in the track so that the panel 80 is constrained in its movement to vertical motion with respect to the main frame. The panel may be adjusted upward or downward to alter the spacing between the lower end of the panel and the bottom of the main frame. As a result the effective opening in the gate is controllable. After the panel 80 is adjusted, it is held in place by tightening setscrews 90 and 92 that are carried by nuts welded onto angle members 84 and 82 or that are in tapped openings in the same angle members. The inner ends of the setscrews enter track 86 and bear against panel 80 to hold it in the correct adjustment.

Although the door 56 is vertically adjustable, panel 80 is independently adjustable to achieve the desired results.

In use, the hogs may push the door in one direction against the yielding opposition of spring 70. However, the door will not move in the opposite direction because it will contact the lower parts of the rails 20 and 22. In the absence of contacting these rails, the door 56 would contact panel 80.

Not only is the gate adjustable as to its vertical position in the main frame, but panel 80 is vertically adjustable to control the effective size of the entrance 98 formed between the lower edge of panel 80 and the bottom of the main frame and the portions of the rails 20 and 22 between the said lower edge of panel 80 and the bottom of the main frame. This excludes hogs above a predetermined size since they will not fit in entrance 98 that is controlled by door 56 and altered as to size of adjustment of panel 80.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an animal gate, a combination of a frame including a pair of spaced side rails extending vertically therefrom, transverse members extending between said side rails and attached to said side rails to hold said side rails rigidly secured, a first panel vertically slidable in said side rails, means attached to said first panel and to one of said transverse members for holding said first panel in a selected vertical position between said side rails, a door horizontally hinged to the lower edge of said first panel and in one way abutting contact with portions of said rails so that said door is pivotable from a vertical position about a horizontal axis in one direction only, a second panel, means vertically adjustably securing said second panel in selected positions on said rails to thereby alter the spacing between the lower edge of said first panel and said frame so that animals above a predetermined size are excluded from passage through said gate.

2. In an animal gate, a combination of a frame including a pair of spaced side rails extending vertically therefrom, transverse members extending between said side rails and attached to said side rails to hold said side rails rigidly secured, a first panel vertically slidable in said side rails, means attached to said first panel and to one of said transverse members for holding said first panel in a selected vertical position between said side rails, a door horizontally hinged to the lower edge of said first panel and in oneway abutting contact with portions of said rails so that said door is pivotable from a vertical position about a horizontal axis in one direction only, a second panel, means vertically adjustably securing said second panel in selected positions on said rails to thereby alter the spacing between the lower edge of said first panel and said frame so that animals above a predetermined size are excluded from passage through said gate, resilient means connected with said door for opposing the movement of said door in said one direction and for returning said door to said vertical position after an animal has passed through said gate.

3. In an animal gate, a combination of a frame including a pair of spaced side rails extending vertically therefrom, transverse members extending between said side rails and attached to said side rails to hold said side rails rigidly secured, a first panel vertically slidable in said side rails, means attached to said first panel and to one of said transverse members for holding said first panel in a selected vertical position between said side rails, a door horizontally hinged to the lower edge of said first panel and in oneway abutting contact with portions of said rails so that said door is pivotable from a vertical position about a horizontal axis in one direction only, a second panel, means vertically adjustably securing said second panel in selected positions on said rails to thereby alter the spacing between the lower edge of said first panel and said frame so that animals above a predetermined size are excluded from passage through said gate, resilient means connected with said door for opposing the movement of said door in said one direction and for returning said door to said vertical position after an animal has passed through said gate, and means secured to the lower edge of said door for preventing the animals from flipping the door upward and attempting to pass through said gate.

References Cited in the file of this patent

UNITED STATES PATENTS

| | | |
|---|---|---|
| 703,130 | Jacobs | June 24, 1902 |
| 1,210,547 | Schutt | Jan. 2, 1917 |
| 1,566,552 | Manson et al. | Dec. 22, 1925 |
| 2,144,896 | Raymond | Jan. 24, 1939 |
| 2,376,630 | Stentz | May 22, 1945 |
| 2,800,103 | Bleeker | July 23, 1957 |